(12) United States Patent
Bordoz et al.

(10) Patent No.: US 8,499,808 B2
(45) Date of Patent: Aug. 6, 2013

(54) VEHICLE TIRE

(75) Inventors: Francis Bordoz, Clermont-Ferrand (FR); Yannick Gerbal, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1092 days.

(21) Appl. No.: 12/279,586

(22) PCT Filed: Feb. 20, 2007

(86) PCT No.: PCT/EP2007/051624
§ 371 (c)(1),
(2), (4) Date: Dec. 30, 2008

(87) PCT Pub. No.: WO2007/096360
PCT Pub. Date: Aug. 30, 2007

(65) Prior Publication Data
US 2009/0218025 A1    Sep. 3, 2009

(30) Foreign Application Priority Data
Feb. 21, 2006   (FR) .................................... 06 01575

(51) Int. Cl.
*B60C 9/18* (2006.01)
(52) U.S. Cl.
USPC ........... 152/527; 152/526; 152/536; 152/537; 152/538
(58) Field of Classification Search
USPC ................. 152/526, 531, 533, 534, 551, 525, 152/527, 536, 537, 538
See application file for complete search history.

(56) References Cited

U.S. PATENT DOCUMENTS

| | | | | |
|---|---|---|---|---|
| 3,554,261 A * | 1/1971 | Mirtain et al. | ............... | 152/455 |
| 5,435,370 A * | 7/1995 | Ahmad et al. | ............... | 152/550 |
| 5,662,751 A * | 9/1997 | Creech | .......... | 152/527 |
| 5,975,175 A * | 11/1999 | Armellin | ...... | 152/454 |
| 5,996,662 A * | 12/1999 | Cluzel | ............ | 152/531 |
| 6,089,293 A * | 7/2000 | Niderost | ........ | 152/527 |
| 6,412,534 B1 * | 7/2002 | Kohno et al. | ................ | 152/527 |
| 6,415,841 B1 * | 7/2002 | Armellin | ....... | 152/531 |
| 6,668,889 B1 * | 12/2003 | Losey et al. | ................ | 152/527 |
| 6,758,252 B2 * | 7/2004 | Bordoz et al. | ................ | 152/454 |

(Continued)

FOREIGN PATENT DOCUMENTS

| | | |
|---|---|---|
| EP | 0 890 455 A2 | 1/1999 |
| WO | WO 01/45966 A1 | 6/2001 |
| WO | WO 2004/018237 * | 3/2004 |

*Primary Examiner* — Joseph Del Sole
*Assistant Examiner* — Seyed Masoud Malekzadeh
(74) *Attorney, Agent, or Firm* — Cozen O'Connor

(57) ABSTRACT

A tire comprising a carcass-type reinforcement structure formed from reinforcing elements anchored on each side of the tire to a bead, the base of which is intended to be mounted on a rim seat, each bead being extended radially outwards by a sidewall, the sidewalls joining, radially outwards, a tread and having, beneath the tread, a crown reinforcement structure consisting of at least two layers of reinforcing elements called working layers, said reinforcing elements of the working layers being of identical nature. In a given circumferential plane, the extensional stiffness per unit width of a first working layer measured along the principal direction of the reinforcing elements of said first layer is strictly higher than the extensional stiffness per unit width of a second working layer measured along the principal direction of the reinforcing elements of said second working layer, the second working layer being radially further away from the carcass structure than said first working layer.

15 Claims, 2 Drawing Sheets

U.S. PATENT DOCUMENTS

| | | |
|---|---|---|
| 7,658,216 B2 * | 2/2010 | Valle et al. .................... 152/531 |
| 2002/0174927 A1 * | 11/2002 | Armellin ....................... 152/531 |
| 2003/0145935 A1 * | 8/2003 | Prost et al. ................. 156/110.1 |
| 2003/0155056 A1 * | 8/2003 | Armellin ....................... 152/450 |
| 2005/0126674 A1 * | 6/2005 | Hardy et al. .................. 152/527 |
| 2005/0217783 A1 * | 10/2005 | Valle et al. .................... 152/531 |

* cited by examiner

VEHICLE TIRE

RELATED APPLICATIONS

This is a U.S. National Phase Application under 35 USC 371 of International Application PCT/EP2007/051624, filed on Feb. 20, 2007

This application claims the priority of French patent application no. 06/01575 filed Feb. 21, 2006, the subject matter of which is hereby incorporated by reference.

FIELD OF THE INVENTION

The invention relates to a tire intended to equip a vehicle and more particularly intended to equip a two-wheel vehicle such as a motorcycle.

Although not limited to such an application, the invention will be described more particularly with reference to such a motorcycle tire.

BACKGROUND OF THE INVENTION

The reinforcement or reinforcement armature of tires, and especially of motorcycle tires, is at the present time—and most often—formed from a stack of one or more plies conventionally denoted as "carcass plies", "crown plies", etc. This way of denoting the reinforcements derives from the manufacturing process, which consists in producing a series of semi-finished products in the form of plies, which are provided with often longitudinal thread-like reinforcing members that are subsequently assembled or stacked so as to build a tire blank. The plies are produced flat, with large dimensions, and are then cut up according to the dimensions of a given product. The assembly of the plies is also carried out, firstly, approximately flat. The blank thus produced then undergoes a forming operation so as to adopt the typical toroidal profile of tires. The semi-finished or "finish" products are then applied to the blank so as to obtain a product ready to be vulcanized.

Such a "conventional" process involves, in particular in respect of the phase of manufacturing the tire blank, the use of an anchoring element (generally a bead wire) used to anchor or retain the carcass reinforcement in the bead zone of the tire. Thus, for this type of process, a portion of all of the plies making up the carcass reinforcement (or only one part thereof) is turned up around a bead wire placed in the bead of the tire. This anchors the carcass reinforcement in the bead.

The generalization in industry of this type of conventional process, despite many variations in the way in which the plies and the assemblies are produced, has led those skilled in the art to use a vocabulary taken from the process: hence the generally accepted terminology comprising, in particular, the terms "plies", "carcass", "bead wire", "shaping", to denote the transition from a flat profile to a toroidal profile, etc.

Nowadays, there are tires which strictly speaking do not have "plies" or "bead wires" according to the above definitions. For example, document EP 0 582 196 discloses tires manufactured without the aid of semi-finished products in the form of plies. For example, the reinforcing elements of the various reinforcement structures are applied directly to the adjacent layers of rubber compounds, the whole assembly being applied in successive layers on a toroidal core, the shape of which results directly in a profile similar to the final profile of the tire under manufacture. Thus, in this case, there are no longer "semi-finished" products or "plies" or "bead wires". The base products, such as rubber compounds and the reinforcing elements in the form of threads or filaments, are directly applied to the core. Since this core is toroidal in shape, it is no longer necessary to form the blank in order to go from a flat profile to a torus-shaped profile.

Moreover, the tires disclosed in the above document do not have the "conventional" carcass ply upturn around a bead wire. This type of anchoring is replaced with an arrangement in which circumferential threads are placed adjacent to said sidewall reinforcement structure, the whole assembly being embedded in an anchoring or bonding rubber compound.

There are also assembly processes on a toroidal core using semi-finished products especially suitable for rapid, effective and simple laying on a central core. Finally, it is also possible to use a hybrid comprising both certain semi-finished products, in order to produce certain architectural aspects (such as plies, bead wires, etc.), whereas others are produced by direct application of compounds and/or reinforcing elements.

In the present document, to take into account recent technological developments both in the manufacturing field and in product design, the conventional terms such as "plies", "bead wires", etc. are advantageously replaced with neutral terms or terms that are independent of the type of process used. Thus, the term "carcass-type reinforcing member" or "sidewall reinforcing member" is valid for denoting the reinforcing elements of a carcass ply in the conventional process, and the corresponding reinforcing elements, which are in general applied to the sidewalls, of a tire built using a process without semi-finished products. As regards the term "anchoring zone", this may denote just as well the "conventional" carcass ply upturn around a bead wire of a conventional process as the assembly formed by the circumferential reinforcing elements, the rubber compound and the adjacent sidewall reinforcing portions of a bottom zone produced by a process with application on a toroidal core.

The longitudinal direction, or circumferential direction, of the tire is the direction corresponding to the periphery of the tire and defined by the rolling direction of the tire.

A circumferential plane or circumferential plane of section is a plane perpendicular to the rotation axis of the tire. The equatorial plane is the circumferential plane passing through the centre or crown of the tread.

The transverse or axial direction of the tire is parallel to the rotation axis of the tire.

The radial direction is a direction cutting the rotation axis of the tire and perpendicular thereto.

The rotation axis of the tire is the axis about which it rotates in normal use.

A radial or meridian plane contains the rotation axis of the tire.

As in the case of all other tires, motorcycle tires have undergone radialization, the architecture of such tires comprising a carcass reinforcement formed from one or two layers of reinforcing elements making an angle that may be between 65° and 90° with the circumferential direction, said carcass reinforcement being radially surmounted by a crown reinforcement formed from reinforcing elements. However, there are non-radial tires to which the invention also relates. The invention also relates to partially radial tires, that is to say those in which the reinforcing elements of the carcass reinforcement are radial at least over part of said carcass reinforcement, for example in the part corresponding to the crown of the tire.

Many crown reinforcement architectures have been proposed, depending on whether the tire is intended to be mounted on the front wheel of the motorcycle or on the rear wheel. A first structure consists, in the case of said crown reinforcement, in employing only circumferential cords, and said structure is more particularly employed for the rear position. A second structure, inspired directly from the structures widely used in tires for passenger vehicles, has been used to improve the wear resistance and consists in the use of at least two crown working layers of reinforcing elements which are approximately mutually parallel in each layer but crossed from one layer to the next, making acute angles with the circumferential direction, such tires being more particularly suitable for the front wheel of motorcycles. Said two crown working layers may be combined with at least one layer of circumferential elements generally obtained by the helical winding of a strip of at least one rubber-embedded reinforcing element.

The choice of tire crown architecture has a direct effect on certain properties of the tires, such as wear, endurance and grip, or else on the rolling comfort or, in particular in the case of motorcycles, on the stability. However, other parameters of the tires, such as the nature of the rubber compounds making up the tread, also have a direct impact on the properties of said tire. The choice and nature of the rubber compounds constituting the tread are for example essential parameters relating to the wear properties. The choice and nature of the rubber compounds making up the tread also have an impact on the grip properties of the tire.

SUMMARY OF THE INVENTION

It is an object of the invention to provide a tire for improving the wear properties of the tire and for improving the grip properties of the tread of said tire, especially when going around a bend in the case of motorcycle tires.

This object has been achieved according to the invention by a tire comprising a carcass-type reinforcement structure formed from reinforcing elements anchored on each side of the tire to a bead, the base of which is intended to be mounted on a rim seat, each bead being extended radially outwards by a sidewall, the sidewalls joining, radially outwards, a tread and having, beneath the tread, a crown reinforcement structure consisting of at least two layers of reinforcing elements called working layers, said reinforcing elements of the working layers being of identical nature, and, in a given circumferential plane, the extensional stiffness per unit width of a first working layer measured along the principal direction of the reinforcing elements of said first layer being strictly higher than the extensional stiffness per unit width of a second working layer measured along the principal direction of the reinforcing elements of said second working layer, the second working layer being radially further away from the carcass structure than said first working layer.

According to an embodiment of the invention, working layers are layers of reinforcing elements making, at least in the central part of the tread, angles of between 10° and 80° with the circumferential direction.

The central zone is a peripheral strip or zone centered on the crown of the tread, which is itself defined by the equatorial plane of the tire.

Within the context of invention, the nature of the reinforcing elements is their constituent material.

The principal direction of the reinforcing elements is defined by the direction of the tangent to the reinforcing elements at the point of intersection between the reinforcing elements and the given circumferential plane.

The width unit is defined within the context of the invention along a direction perpendicular to the principal direction of the reinforcing elements.

The extensional stiffness of a layer of reinforcing elements is that property of said layer of reinforcing elements linking a stress supported by said layer to the corresponding deformation of said layer.

A tire thus produced according to the invention and including a second layer radially further away from the carcass structure than the first layer, firstly gives the tread a lower radial stiffness—such a property of the tire tread makes it possible to increase the contact surface, or contact area, of said tread with the ground during rolling and thus optimize the transmission of both accelerating and braking torques, while improving properties in terms of tread wear.

Secondly, constructing a tire in accordance with the invention provides the tire with higher circumferential stiffness and higher axial stiffness, and therefore better road-holding or better grip performance, especially when going round bends. These higher circumferential and axial stiffnesses according to the invention, with respect to given overall circumferential and axial stiffnesses, are a consequence of the increase in stiffness of the working layer radially closest to the carcass structure, and therefore participating most effectively in said circumferential and axial stiffnesses.

In accordance with an embodiment of the invention, when the tire comprises more than two working layers, the extensional stiffness per unit width of the working layers, measured along the principal direction of the reinforcing elements of said layers, gradually decreases when the radial distance between the working layer and the carcass structure increases. In other words, for example in the case of three working layers, the extensional stiffness per unit width of the third working layer measured along the principal direction of the reinforcing elements of said third layer is strictly lower than the extensional stiffness per unit width of the second working layer measured along the principal direction of the reinforcing elements of said second working layer, the second working layer being radially closer to the carcass structure than said third working layer and the second working layer being radially further from the carcass structure than a first working layer, said first working layer having an extensional stiffness per unit width measured along the principal direction of the reinforcing elements of said first layer which is strictly higher than the extensional stiffness per unit width of said second working layer measured along the principal direction of the reinforcing elements of said second working layer.

According to a first embodiment of the invention, the diameters of the reinforcing elements of the first working layer are larger than the diameters of the reinforcing elements of the second working layer.

According to a second embodiment of the invention, the density of reinforcing elements of the first working layer is higher than the density of reinforcing elements of the second working layer.

According to other embodiments of the invention, the difference in stiffness between the working layers may also be obtained by a combination of the abovementioned two embodiments.

According to one or other of these embodiments of the invention, at least in the central zone of the tread and in a given circumferential plane, the absolute value of the angles made with the circumferential direction by the reinforcing elements of the various working layers are different from one working layer to another. Tests have also shown that variation in the angles of the reinforcing elements from one working layer to another may also allow the stiffnesses of the tire to be modified.

According to a preferred alternative embodiment of the invention, at least in the central zone of the tread, the reinforcing elements of one working layer have angles, made with the longitudinal direction, which are identical, said angles being measured at the points of intersection with a circumferential plane, whatever said circumferential plane. In other words, for a given circumferential plane of section, the reinforcing elements all have the same angle made with the longitudinal direction at the point of intersection with said circumferential plane of section. Moreover, the aforementioned angle may vary according to the circumferential plane of section in question.

According to a preferred embodiment of the invention, at least in the central zone of the tread, the reinforcing elements are equidistant from one another in all circumferential planes, it being possible for the distance separating adjacent reinforcing elements to vary depending on the circumferential plane of section in question, or more precisely it being possible for the distance between adjacent reinforcing elements to vary along the axial direction.

Also preferably, at least in the central zone of the tread, the reinforcing elements of two radially adjacent working layers make angles of between 20° and 160° between them.

An alternative embodiment of the invention provides for at least one working layer to be produced at least partly radially to the inside of the carcass-type reinforcement structure.

According to a first embodiment of the invention, all the working layers are produced radially to the inside of at least one carcass structure, that is to say to the inside of at least one carcass layer. At least one carcass-type reinforcement structure thus radially covers the complete crown reinforcement structure.

According to a second preferred embodiment of the invention, at least one working layer of reinforcing elements of the crown reinforcement structure is produced radially to the outside of the carcass-type reinforcement structure. According to this second embodiment of the invention, the working layer of reinforcing elements assumes a protective function with respect to the carcass and with respect to the other layers of the crown reinforcement structure, by protecting them from any mechanical attack.

In an advantageous variant of the invention, a working layer of reinforcing elements may be produced in several parts placed in various radial positions or at various levels in the tire. Such a tire may in particular include part of the working layer of reinforcing elements radially to the outside of the reinforcing elements of the carcass structure in the central part of the tire, that is to say beneath the central part of the tread. This part of the working layer of reinforcing elements therefore makes it possible in particular to protect the carcass from any attack that may occur via the central part of the tread, considered to be the most exposed part. The invention also provides, in the case of a working layer of reinforcing elements produced in several parts placed at different radial positions, for the distribution of these various parts not to be symmetrical with respect to the equatorial plane, or the circumferential plane passing through the centre of the tire crown.

In accordance with this type of embodiment of a working layer of reinforcing elements divided into several parts, the invention advantageously provides for the axial ends of said parts to overlap one another.

A tire according to the invention, especially when at least part of the crown reinforcement structure is produced radially to the inside of the carcass structure, is advantageously produced using a technique of the type with manufacture on a hard core or rigid form.

According to an alternative embodiment of the invention, at least one working layer of reinforcing elements consists of at least one continuous reinforcing thread forming, in the central zone of said layer, portions having angles, made with the longitudinal direction, which are identical, said angles being measured at the points of intersection with a circumferential plane, two adjacent portions being linked by a loop and the portions making an angle of between 10° and 80° with the longitudinal direction.

The term "thread" denotes in all generality both monofilaments, multifilament fibers (possibly twisted on themselves) or assemblies such as textile or metal cords, folded yarns or else any type of equivalent assembly such as, for example, a hybrid cord, and whatever the material or materials, the possible treatment of these threads, for example a surface treatment or coating or precoating, so as to promote adhesion to the rubber or any other material.

According to this advantageous variant of the invention, the working layer is produced with at least one thread, no free end of which is present on the edges of said layer. Preferably, the layer is produced with a single thread and the layer is of the "mono-thread" type. However, the industrial production of such layers leads to discontinuities, in particular due to bobbin changes. A preferred embodiment of the invention also consists in using only a single thread or a small number of threads for a working layer and it is recommended to place the start and end of the threads in the central zone of said layer.

A tire according to the invention thus produced has a reinforcement structure that has no free end of the reinforcing elements at the axially outer edges of the working layers.

Studies carried out have in particular demonstrated that the presence of the usual layers of reinforcing elements making an angle with the longitudinal direction leads to local, circumferential and shear stiffnesses that decrease upon approaching the edges of said layers, the tension at the ends of the reinforcing elements being zero. A zero local tension of the reinforcing elements is reflected in a reduced effectiveness of said reinforcing elements in this zone. Now, the stiffnesses of the edges of the layers are particularly important when the tire is used at high camber angles, on bends, that part of the tire corresponding to these zones then facing the ground.

The production of motorcycle tires leads to high curvature values for use of said tires in cambered mode. A tire produced according to this variant of the invention, which comprises a reinforcement structure having no free end of the reinforcing elements at the axially outer edges of the working layers, thus makes it possible in particular to increase the grip and traction of tires when used with a high camber angle.

Such a tire is advantageously produced using a technique of the type on a hard or toroidal core, which in particular allows the reinforcing elements to be placed in virtually the final position. This is because, since a shaping step is not required in this type of process, the reinforcing elements are no longer displaced after they have been put into position.

In an advantageous embodiment of the invention, especially for further optimizing the stiffnesses of the reinforcement structure along the meridian of the tire, and in particular at the edges of the working layers, the angles made by said portions of the thread of the working layers with the longitudinal direction can vary depending on the transverse direction such that said angles are larger on the axially outer edges of the layers of reinforcing elements than the angles of said portions measured in the equatorial plane of the tire.

The use of a technique of the type on a hard core, which makes it possible in particular to place the reinforcing elements in virtually the final position without requiring a shaping step has further advantages. This is because a technique of the type on a hard core permits, in particular, in a simple manner, variations in angle that are considerably larger than can be obtained using processes that include a shaping step. Furthermore, said variations in angle, said angle tending towards 90° at the edges of the working layers, lead to an increase in the pitch and promote the formation of loops, owing to the reduction in overall size.

A first method of implementing the embodiment variants of the invention in which the angles made by said portions of the thread of the working layers with the longitudinal direction can vary depending on the transverse direction consists in making the angle of the portions vary monotonically from the equatorial plane of the tire to the edges of the working layer.

A second method of implementing these variants consists in making the angle change in steps from the equatorial plane of the tire to the edges of the working layer.

A final method of implementing these variants consists of a change in the angle such that given values are obtained for given axial positions.

These various methods of implementing the embodiment variants of the invention in which the angles made by said portions of the thread of the working layers with the longitudinal direction can vary depending on the transverse direction make it possible, in other words, to obtain a high circumferential stiffness of the crown reinforcement structure by the presence of closed angles, i.e. small angles, in the crown zone of the tire, that is to say in the zone flanking the equatorial plane. In contrast, the presence of open angles, i.e. angles tending towards 45° or even towards 90°, may be obtained on the edges of the working layer or more precisely at the shoulders of the tire, so as to improve the grip, the traction, the comfort or even the operating temperature of the tire. This is because such variations in angle allow the shear stiffnesses of the working layers to be modulated.

According to a preferred embodiment of the invention, the reinforcing elements of the working layers are made of textile material.

According to another embodiment of the invention, the reinforcing elements of the working layers are made of metal.

A preferred embodiment of the invention provides for the tire to consist in particular of a crown reinforcement structure that also comprises at least one layer of circumferential reinforcing elements. According to the invention, the layer of circumferential reinforcing elements consists of at least one reinforcing element oriented at an angle of less than 5° to the longitudinal direction.

The presence of a layer of circumferential reinforcing elements is particularly preferable for the production of a tire intended to be used on the rear wheel of a motorcycle.

One advantageous embodiment of the invention provides for the layer of circumferential reinforcing elements to be positioned at least partly on a working layer. When the layer of circumferential reinforcing elements is produced on two working layers and placed directly beneath the tread, it may in particular contribute to improving stability at high speed.

The layer of circumferential reinforcing elements may thus be produced directly beneath the tread so as to form, apart from its primary function, a protective layer for protecting the carcass and the other layers of the crown reinforcement structure from possible mechanical attack.

The layer of circumferential reinforcing elements may also be produced between the working layers, especially for the sake of economy, the amount of material and the positioning time thus being reduced.

Another advantageous embodiment of the invention provides for the layer of circumferential reinforcing elements to be at least partly positioned radially to the inside of the radially innermost working layer. According to this embodiment, the layer of circumferential reinforcing elements is produced radially to the inside of the working layers and may in particular help to improve the grip and traction of the tire.

Another variant of the invention provides for at least one layer of circumferential reinforcing elements to be at least partly positioned radially to the inside of the carcass-type reinforcement structure. This embodiment variant may also adopt the various abovementioned positions relative to the working layers. Thus, the carcass may cover the complete crown reinforcement structure. Preferably, the invention provides for at least one crown reinforcement layer to be positioned between the carcass and the tread so as to protect the carcass.

As mentioned previously, it should be noted that a tire according to the invention, especially when at least part of the crown reinforcement structure is produced radially to the inside of the carcass structure, is advantageously produced using a manufacturing technique of the type on a hard core or rigid form.

Also preferably, the reinforcing elements of the layer of circumferential reinforcing elements are metallic and/or textile and/or glass elements. The invention in particular provides for the use of reinforcing elements of different natures within one and the same layer of circumferential reinforcing elements.

Also preferably, the reinforcing elements of the layer of circumferential reinforcing elements have a modulus of elasticity greater than 6000 N/mm$^2$.

In an advantageous variant of the invention, a layer of circumferential reinforcing elements may be produced in several parts placed in various radial positions or various levels of the tire. Such a tire may in particular include a part of the layer of circumferential reinforcing elements radially to the outside of the other reinforcing elements in the central part of the tire, i.e. beneath the central part of the tread. This part of the layer of circumferential reinforcing elements then makes it possible in particular to protect the carcass from any attack that may occur via the central part of the tread, which is considered to be the most exposed. Lateral parts of the layer of circumferential reinforcing elements, independent of the central part of said layer of circumferential reinforcing elements, may be positioned at any level, i.e. either radially to the inside of the working layers or between them or else radially to the inside of the carcass layer, especially so as to reduce the quantity of reinforcing elements and the time required to produce such a layer of circumferential reinforcing elements. The invention also provides, in the case of a layer of circumferential reinforcing elements produced in several parts placed at different radial positions, for the distribution of these various parts not to be symmetrical with respect to the equatorial plane, or circumferential plane passing through the centre of the tire crown. Such a non-symmetrical distribution may also be associated with a choice of different materials for the circumferential reinforcing elements.

In accordance with this type of construction of a layer of circumferential reinforcing elements divided into several parts, the invention advantageously provides for a mutual overlap of the axial ends of said parts.

An embodiment variant of the invention advantageously provides for the circumferential reinforcing elements to be distributed along the transverse direction with a variable pitch.

According to a first method of implementing this variant of the invention, said pitch at the centre (top) of the tread is smaller than at the edges of said layer. Such an embodiment according to the invention in particular promotes resistance to the external attack which is greater in the central zone of the tire.

According to a second method of implementing this variant of the invention, said pitch at the centre (top) of the tread is greater than at the edges of said layer. Such an embodiment according to the invention especially promotes flattening of the tire at high camber angles.

According to a preferred embodiment of the invention, the value of the pitch along the transverse direction obeys a series over at least part of the axial width of said layer going as far as the edges of said layer. According to such an embodiment, the pitch between the circumferential reinforcing elements of said layer is advantageously constant in a zone covering the top of the tread.

According to a first embodiment, the value of the pitch obeys an arithmetic series of the type $U(n)=U_o+nr$, where $U_o$ is between 0.4 mm and 2.5 mm and r, the ratio of consecutive terms of the series, is between 0.001 and 0.1.

According to a second embodiment, the value of the pitch obeys a geometric series of the type $U(n)=U_o \times rn$, where $U_o$ is between 0.4 mm and 2.5 mm and r, the ratio of consecutive terms of the series, is between 1.001 and 1.025.

According to other embodiments of the invention, the value of the pitch may be a combination of several series depending on the axial position on said layer.

The variation in the pitch between the circumferential reinforcing elements results in a variation in the number of circumferential reinforcing elements per unit length along the transverse direction and consequently in a variation in the density of circumferential reinforcing elements along the transverse direction and therefore in a variation in the circumferential stiffness along the transverse direction.

Advantageously, in the case of a radial structure, the reinforcing elements of the carcass-type reinforcement structure make an angle of between 65° and 90° with the circumferential direction.

One advantageous embodiment of the invention also provides for the carcass-type reinforcement structure to consist of two half-plies extending for example from the shoulders to the beads. Depending on the nature, the quantity and the arrangement of the crown reinforcement elements, the invention effectively dispenses with the carcass structure in at least part of the zone of the tire lying beneath the tread. Such a carcass structure may be produced according to the teaching of document EP-A-0 844 106. The above-mentioned relative positions of the various layers of the crown reinforcement structure are also compatible with such a carcass structure.

BRIEF DESCRIPTION OF THE DRAWINGS

Further details and advantageous characteristics of the invention will become clear below from the description of exemplary embodiments of the invention with reference to FIGS. 1 and 2 which show.

DETAILED DESCRIPTION OF THE DRAWINGS

Figure 1:
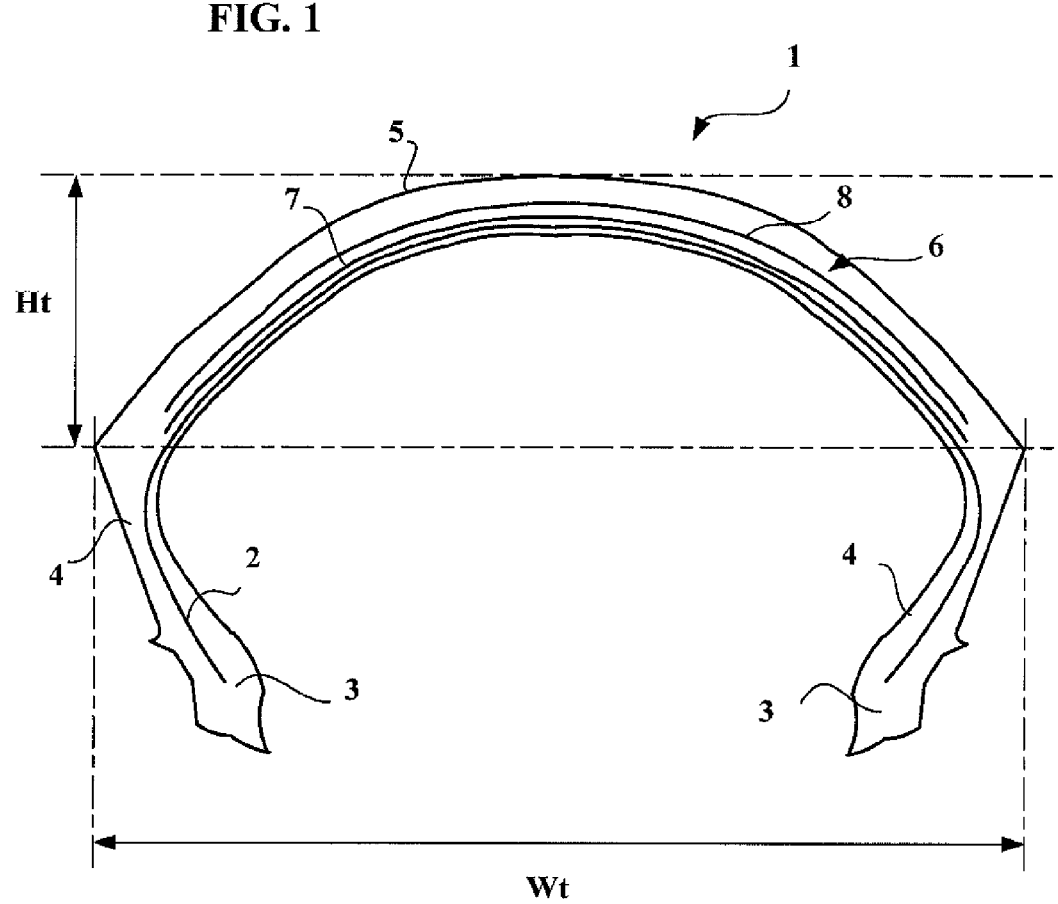
FIG. 1, a meridian view of a diagram of a tire according to a first embodiment of the invention.
Figure 2:
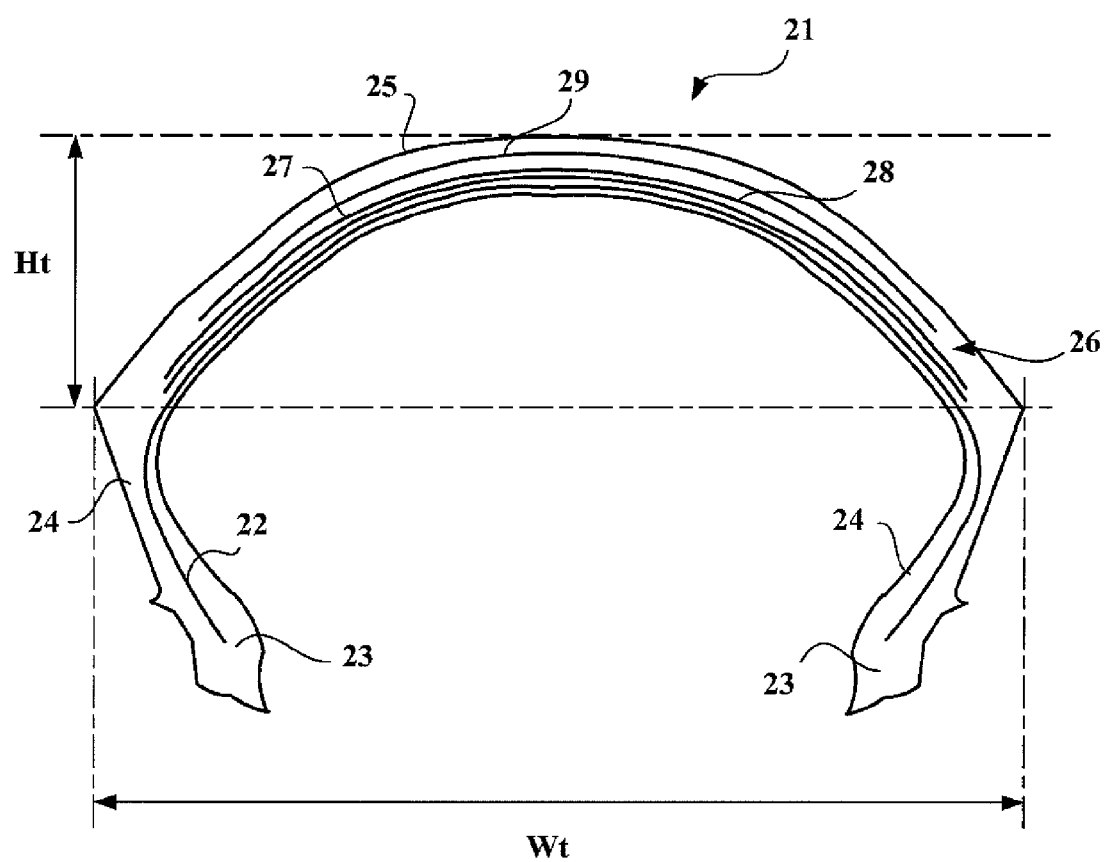
FIG. 2, a meridian view of a diagram of a tire according to a second embodiment of the invention.

FIGS. 1 and 2 have not been drawn to scale so as to make it simpler to understand them.

FIG. 1 shows a tire 1 comprising a carcass reinforcement consisting of a single layer 2 comprising textile-type reinforcing elements. The layer 2 is made up of reinforcing elements placed radially. The radial positioning of the reinforcing elements is defined by the lay angle of said reinforcing elements. A radial arrangement corresponds to a lay angle of said elements relative to the longitudinal direction of the tire of between 65° and 90°.

Said carcass layer 2 is anchored on each side of the tire 1 in a bead 3, the base of which is intended to be mounted on a rim seat. Each bead 3 is extended radially towards the outside by a sidewall 4, said sidewall 4 meeting the tread 5 radially to the outside. The tire 1 thus formed has a curvature value of greater than 0.15 and preferably greater than 0.3. The curvature value is defined by the Ht/Wt ratio, i.e. the ratio of the height of the tread to the maximum width of the tread of the tire. The curvature value will advantageously be between 0.25 and 0.5 for a tire intended to be mounted on the front wheel of a motorcycle and will advantageously be between 0.2 and 0.5 for a tire intended to be mounted on the rear wheel.

The tire 1 also includes a crown reinforcement 6 consisting of two layers 7 and 8 of reinforcing elements making angles with the circumferential direction, said reinforcing elements being crossed from one layer to the next by making angles equal to 50° between them in the zone of the equatorial plane, the reinforcing elements of each of the layers 7 and 8 making an angle of 25° with the circumferential direction.

The reinforcing elements of the two layers 7 and 8 are made of textile material and more precisely of an aramid.

The density of reinforcing elements in the radially innermost layer 7 is equal to 95 threads/dm (threads per decimeter). The density of reinforcing elements in the radially outermost layer 8 is equal to 45 threads/dm.

In accordance with the invention, the density of reinforcing elements of the radially innermost layer 7 is greater than the density of reinforcing elements of the radially outermost layer 8.

Tests have been carried out with such a tire of 120/70R17 size and compared with those carried out with a standard tire of the same size consisting of a similar architecture, the two working layers having identical densities of reinforcing elements equal to 70 threads/dm and the reinforcing elements making angles identical to those of the tire according to the invention.

The standard tire used for the comparison thus has an overall stiffness, defined in particular by the sum of the densities of reinforcing elements of the working layers, which is identical to that of the tire according to the invention.

Two types of tests were carried out. Firstly, qualitative tests were carried out on a circuit by the same rider on the same motorcycle equipped in succession with the two types of tires on the front wheel. It turned out during these tests that the tires permit higher speeds on negotiating a bend with the tires according to the invention or else, for a given speed, better control of the motorcycle. These observations may be explained, as mentioned above, by a larger footprint on the ground and also, in particular, by a higher axial stiffness.

The second type of test carried out is quantitative. This consisted in determining the distance traveled by each of the tires on test machines simulating tires running in a straight line with an imposed load. The tire according to the invention exhibits an increase in distance traveled of the order of 4% compared with the distance traveled by the standard reference tire.

FIG. 2 shows a tire 21 similar to that in FIG. 1 but differing by the presence of a layer of circumferential reinforcing elements 29 radially to the outside of the layers 27, 28 of the crown reinforcement 26. The layer of circumferential reinforcing elements 29 is thus the radially outer part of the crown reinforcement and the two working layers 27, 28 are inserted between the carcass layer 22 and the layer of circumferential reinforcing elements 29. The layer of circumferential reinforcing elements is advantageously formed from a single thread wound so as to make an angle of approximately 0° with the longitudinal direction. The layer of circumferential reinforcing elements may also be produced by the simultaneous winding of several bare threads or in the form of strips when they are embedded in rubber.

As in the case shown in FIG. 1, the working layers 27, 28 consist of textile reinforcing members and are produced according to the invention, the density of reinforcing elements of the radially innermost layer 27 being higher than the density of reinforcing elements of the layer 28.

Of course, the invention must not be interpreted in a limiting manner in view of these two exemplary embodiments. The variations in extensional stiffness per unit width of a working layer measured along the principal direction of the reinforcing elements of said layer may also be obtained for example by differences in diameter of the reinforcing elements or else by a combination of various means.

The invention also extends to tires that may include more complex crown reinforcements comprising, for example, three or more working layers of reinforcing elements making an angle with the circumferential direction.

The invention also applies to the various crown reinforcement cases mentioned previously and in particular described in patent applications WO 2004/018236, WO 2004/018237, WO 2005/070704 and WO 2005/070706, having especially the various radial positions of the layers constituting the crown reinforcement with respect to one another, and also their radial position with respect to the carcass structure, and also the construction of a layer formed by a thread constituting portions linked by loops or else the variation in the angles of said portions along the axial direction.

The invention claimed is:

1. A tire comprising a carcass-type reinforcement structure formed from reinforcing elements anchored on each side of the tire to a bead, the base of which is intended to be mounted on a rim seat, each bead being extended radially outwards by a sidewall, the sidewalls joining, radially outwards, a tread and having, beneath the tread, a crown reinforcement structure comprised of two layers of reinforcing elements called working layers, said reinforcing elements of the working layers being of identical nature, wherein, in a given circumferential plane, the extensional stiffness per unit width of a first working layer measured along the principal direction of the reinforcing elements of said first layer is strictly higher than the extensional stiffness per unit width of a second working layer measured along the principal direction of the reinforcing elements of said second working layer and wherein the second working layer is radially further away from the carcass structure than said first working layer.

2. The tire according to claim 1, wherein the diameters of the reinforcing elements of the first working layer are larger than the diameters of the reinforcing elements of the second working layer.

3. The tire according to claim 1, wherein the density of reinforcing elements of the first working layer is higher than the density of reinforcing elements of the second working layer.

4. The tire according to claim 1, wherein, at least in the central zone of the tread and in a given circumferential plane, the angles made with the circumferential direction by the various reinforcing elements of the working layers are different from one working layer to another.

5. The tire according to claim 1, wherein, at least in the central zone of the tread, the reinforcing elements of one working layer have angles, made with the longitudinal direction, which are identical, said angles being measured at the points of intersection with a circumferential plane, whatever said circumferential plane.

6. The tire according to claim 1, wherein, at least in the central zone of the tread, the reinforcing elements of two radially adjacent working layers make angles of between 20° and 160° between them.

7. The tire according to claim 1, wherein, in one and the same working layer, the reinforcing elements are equidistant from one another in all circumferential planes.

8. The tire according to claim 1, wherein at least one working layer of reinforcing elements consists of at least one continuous reinforcing thread forming, in the central zone of said layer, portions having angles, made with the longitudinal direction, which are identical, said angles being measured at the points of intersection with a circumferential plane, wherein two adjacent portions are linked by a loop and wherein the portions make an angle of between 10° and 80° with the longitudinal direction.

9. The tire according to claim 8, wherein the angles made by said portions with the longitudinal direction can vary depending on the transverse direction and wherein said angles are larger on the axially outer edges of the layers of reinforcing elements than the angles of said portions measured in the equatorial plane of the tire.

10. The tire according to claim 1, wherein the reinforcing elements of the carcass-type reinforcement structure make an angle of between 65° and 90° with the circumferential direction.

11. The tire according to claim 1, wherein the carcass-type reinforcement structure is produced from two half-plies extending from the shoulders to the beads.

12. The tire according to claim 1, wherein the reinforcing elements of the working layers are made of textile material.

13. The tire according to claim 1, wherein the reinforcing elements of the working layers are made of metal.

14. The tire according to claim 1, wherein the crown reinforcement structure comprises a layer of circumferential reinforcing elements.

15. The tire according to claim 14, wherein the reinforcing elements of the layer of circumferential reinforcing elements are metallic and/or textile and/or glass elements.

* * * * *